(12) United States Patent
Lee et al.

(10) Patent No.: US 6,636,966 B1
(45) Date of Patent: Oct. 21, 2003

(54) DIGITAL RIGHTS MANAGEMENT WITHIN AN EMBEDDED STORAGE DEVICE

(75) Inventors: Lane W. Lee, Lafayette, CO (US); Daniel R. Zaharris, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 0 days.

(21) Appl. No.: 09/542,510

(22) Filed: Apr. 3, 2000

(51) Int. Cl.[7] .................................................. H04L 9/30
(52) U.S. Cl. ...................................... 713/165; 713/171
(58) Field of Search ............................... 705/44, 50, 51, 705/57; 713/165, 171, 201; 380/286

(56) References Cited

U.S. PATENT DOCUMENTS

| | | | |
|---|---|---|---|
| 4,386,233 A | * 5/1983 | Smid et al. | 178/22.08 |
| 5,337,357 A | * 8/1994 | Chou et al. | 380/4 |
| 5,912,969 A | 6/1999 | Sasamoto et al. | 380/5 |
| 6,002,772 A | 12/1999 | Saito | |
| 6,098,053 A | * 8/2000 | Slater | 705/44 |
| 6,249,866 B1 | * 6/2001 | Brundrett et al. | 713/165 |
| 6,471,068 B1 | * 10/2002 | Kido et al. | 207/103 R |

FOREIGN PATENT DOCUMENTS

| | | | |
|---|---|---|---|
| EP | 704785 | 4/1996 | |
| WO | WO 98/42098 | 9/1998 | H04L/9/00 |
| WO | WO 00/08909 | 2/2000 | |

OTHER PUBLICATIONS

Keitaide–Music Consortium, "Keitaide–Music Technical Specification (Ver0.9)/Part 1", (Jan. 2000), Corporate Technology Planning Dept. R&D Headquarters, SANYO Electric Co., Ltd., 26 pages.

* cited by examiner

Primary Examiner—John W. Hayes
Assistant Examiner—Pierre E. Elisca
(74) Attorney, Agent, or Firm—MacPherson Kwok Chen & Heid LLP

(57) ABSTRACT

A method is provided for enabling locked data stored on a storage medium and accessing it through a data storage engine contained within or connected to a host device. A user selects all or part of the data stored on the storage medium to enable. The host device then connects to a server over a network and completes a transaction. The transaction can be any requirement specified by the supplier of the data selected by the user. Once the transaction is complete, the data storage engine connects to the same or a separate server through the host device and receives a piece of information, known as the content key, necessary to decrypt, read, or otherwise make sense of the data selected by the user. The content key may be, for example, part of a decryption key. The content key is combined with other information stored on the storage medium. The combined information is then used to access the data selected by the user.

19 Claims, 13 Drawing Sheets

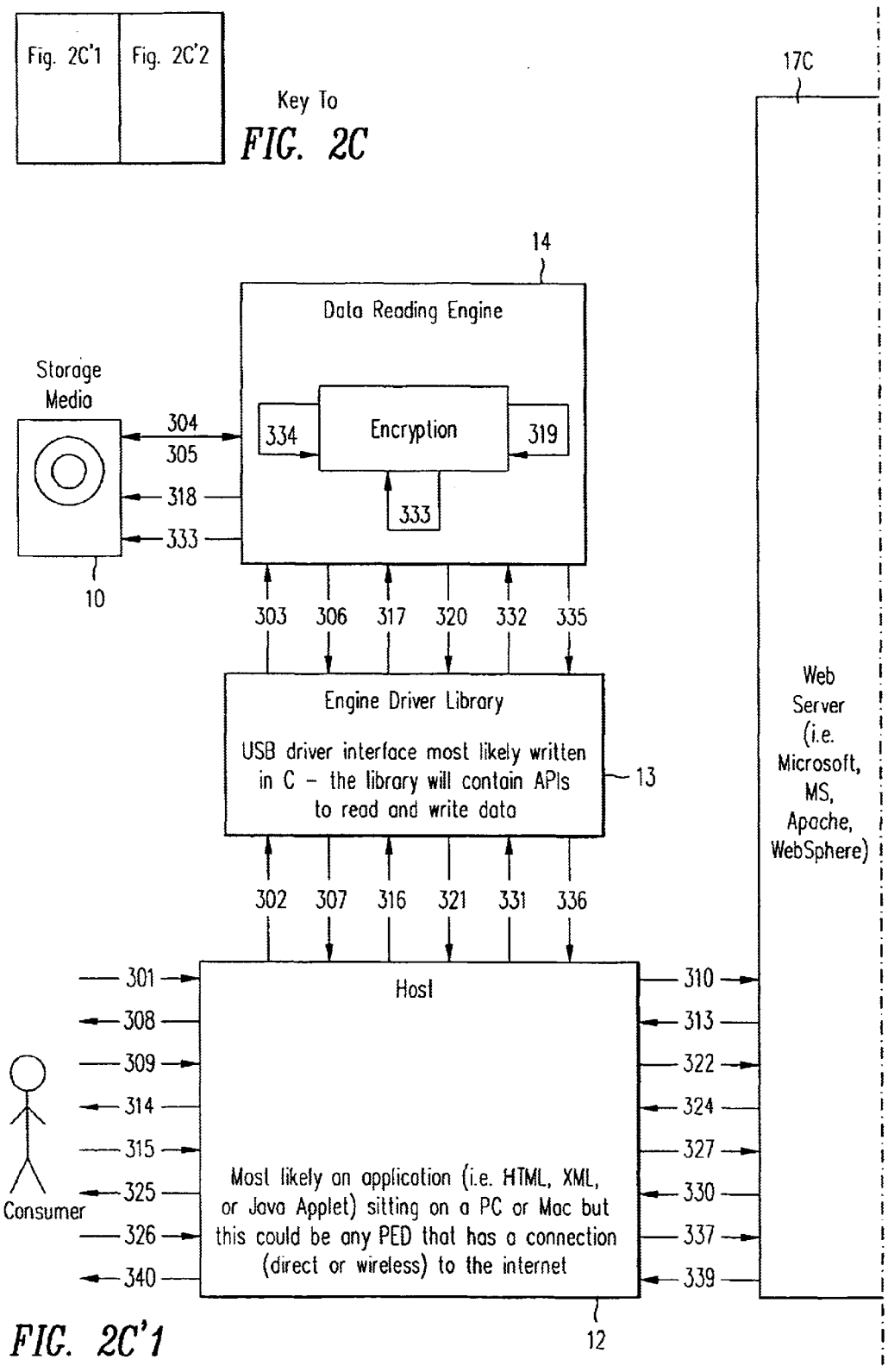

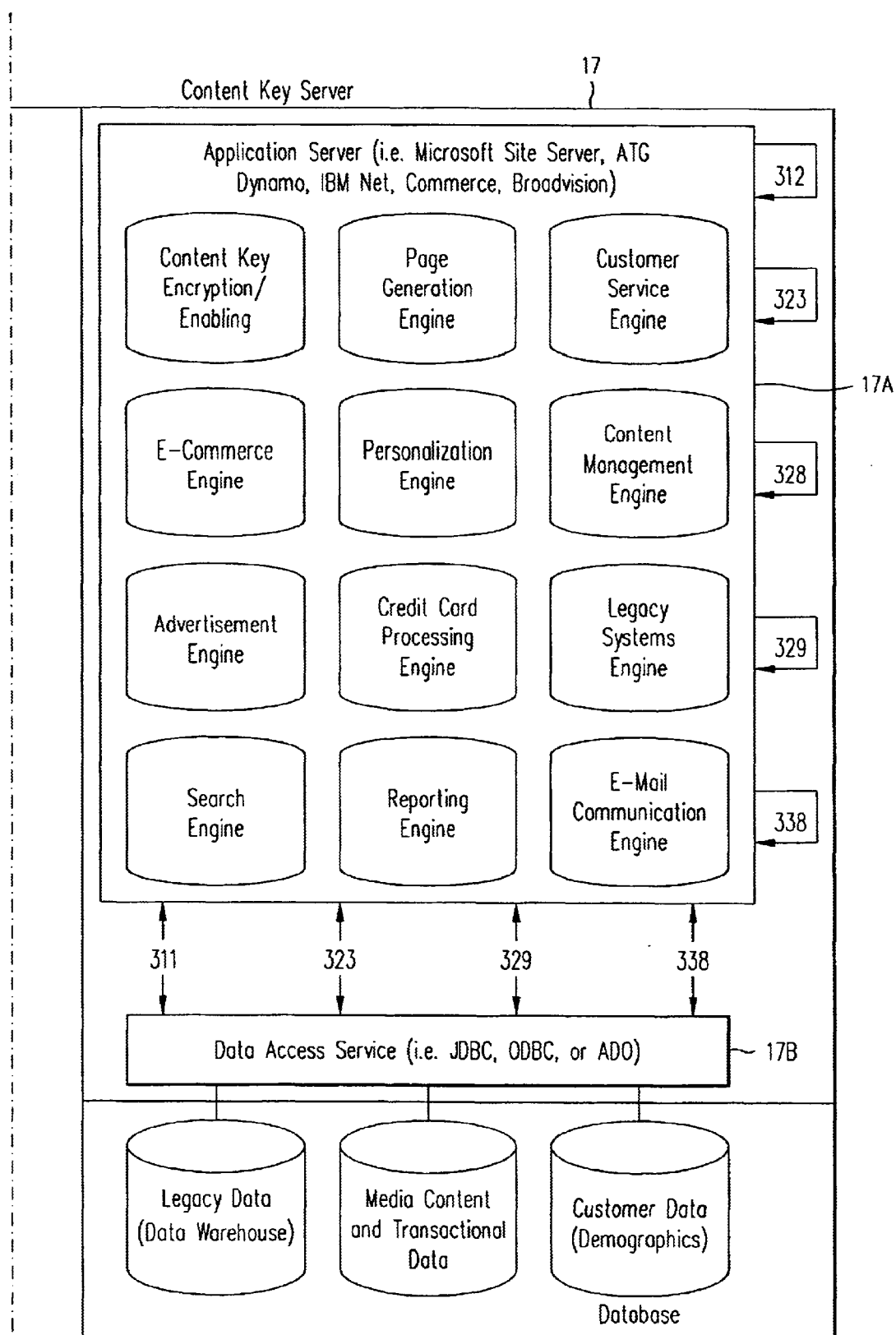
FIG. 2C'2

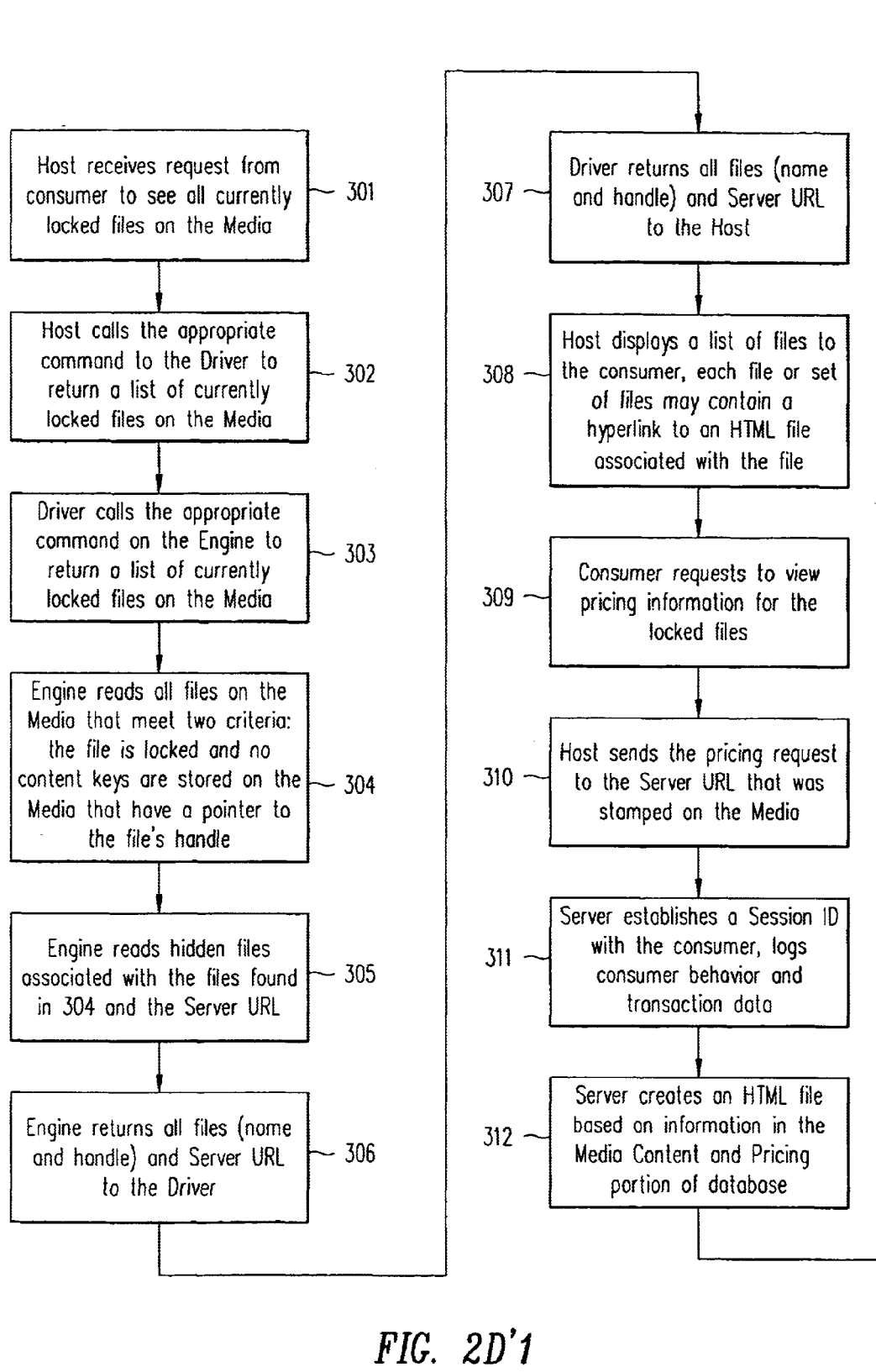
FIG. 2D'1

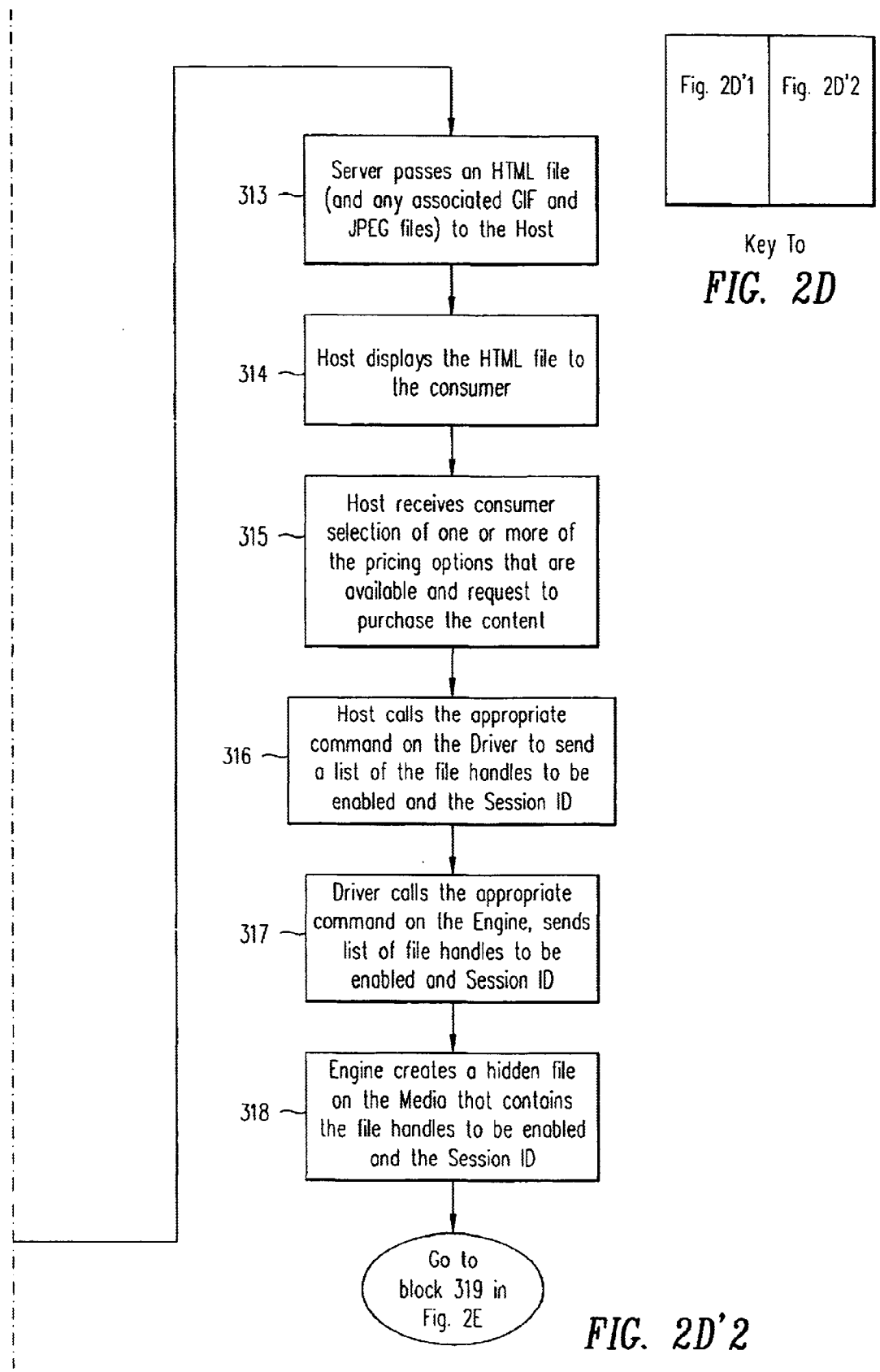

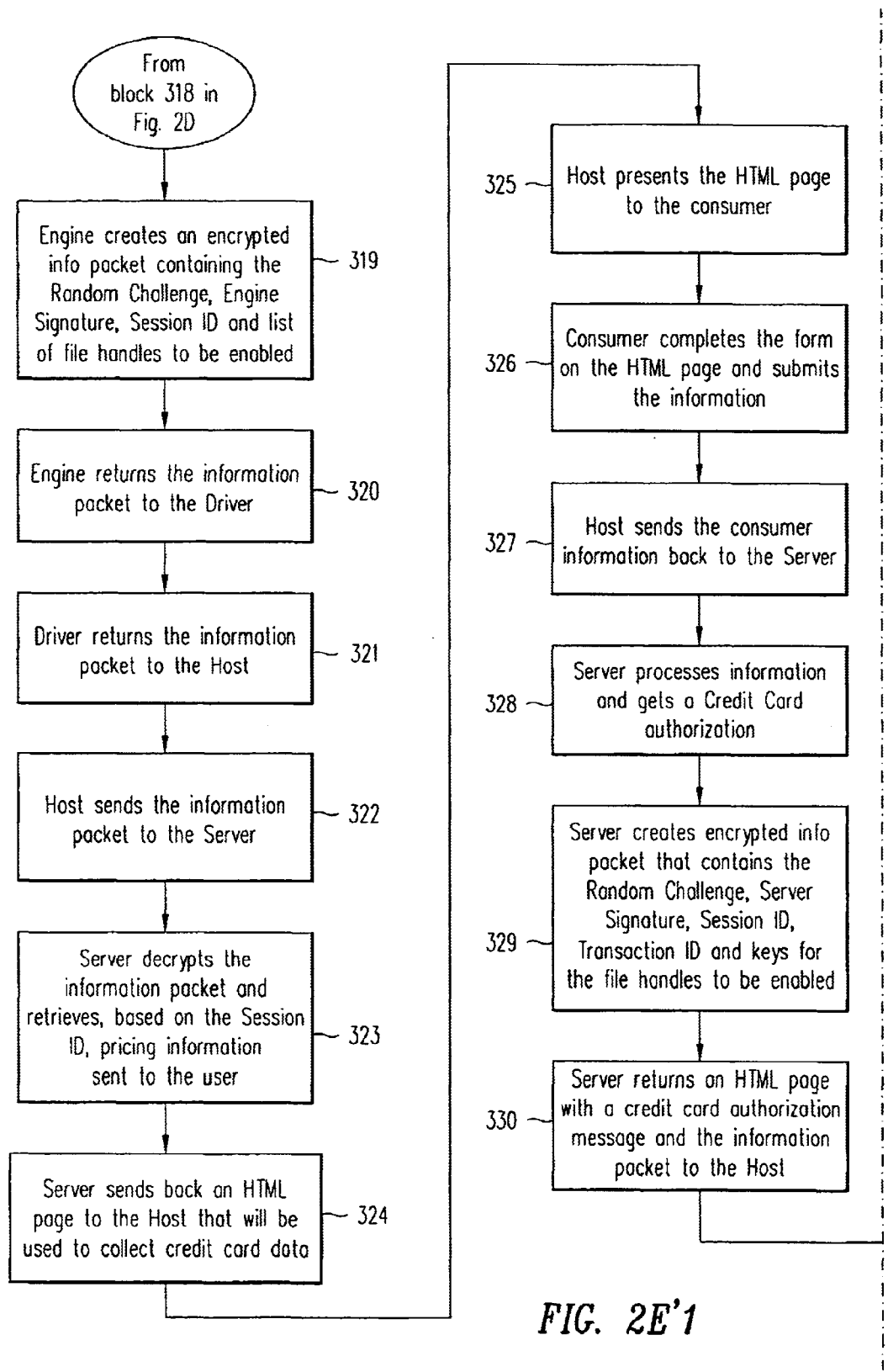
FIG. 2E'1

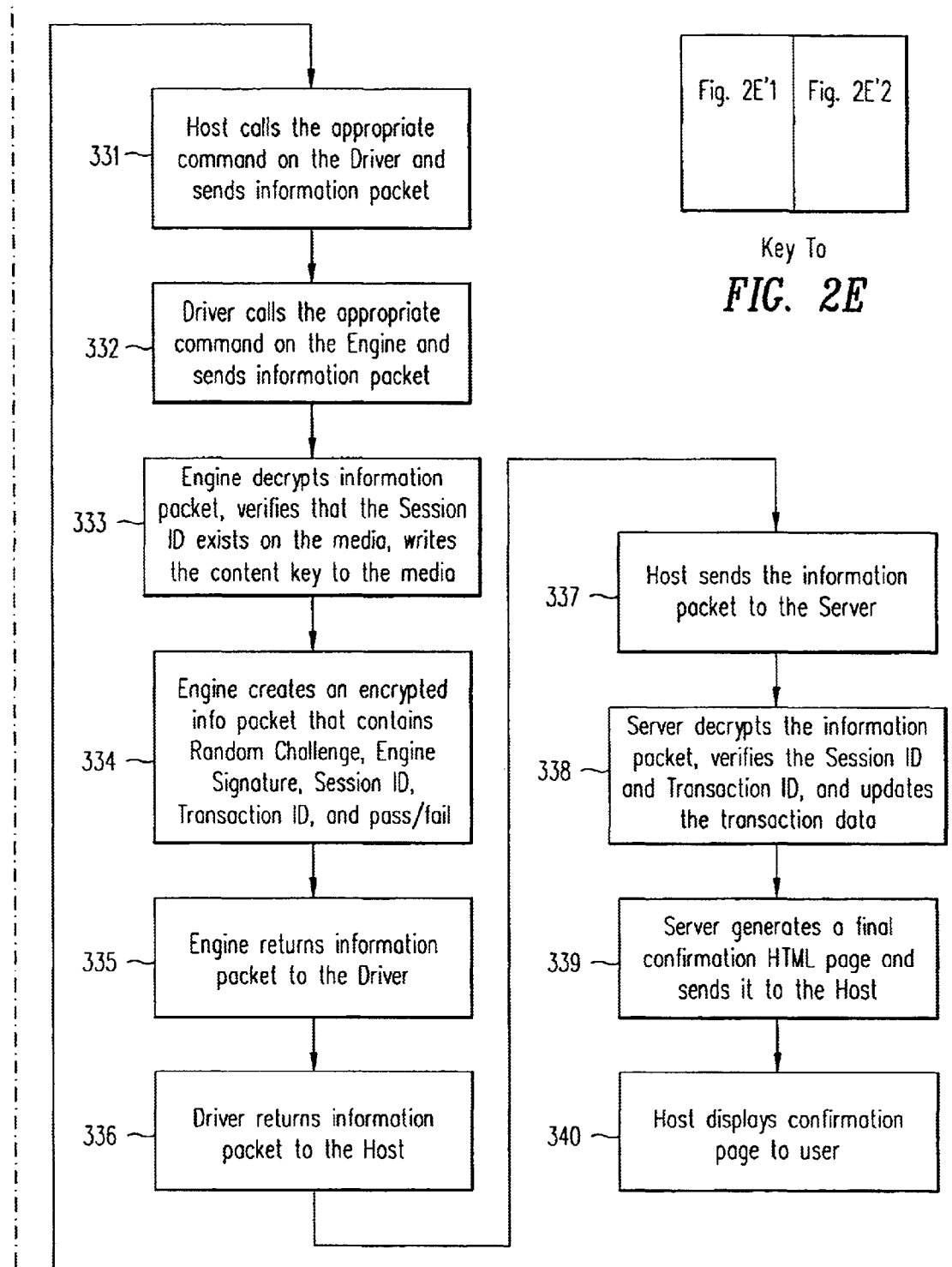

DIGITAL RIGHTS MANAGEMENT WITHIN AN EMBEDDED STORAGE DEVICE

BACKGROUND

1. Field of the Invention

The present invention relates generally to methods of enabling data stored on storage media and more specifically to a method and apparatus for enabling data by retrieving from a computer a piece of information necessary to access the data and combining that information with information stored on the storage medium containing the data to access the data.

2. Description of the Prior Art

As distribution systems for various types of content have historically developed, distribution systems have taken on certain relatively inflexible structures. For example, in distribution of music or motion pictures, a publisher typically produces, or arranges for production of, physical media (such as CDs or video tapes or DVDs), arranges for sales through retail locations, mail order houses (or in the case of movies, to movie rental services), with royalties from the sales going to the content owners. It is believed that a more flexible distribution system, e.g., allowing content owners to decide whether to sell physical media, bit-stream content, or both can not only enhance revenue streams for publishers and content owners, but also make content more widely available to consumers.

The need for alternative channels for content distribution is consistent with the popularity of electronic downloading of content, including downloading of MP3-format music and other content. However, electronic downloading, in current forms, is relatively susceptible to misuse, such as copyright violations, depriving content owners of potential revenue. Accordingly, it would be useful to provide for content distribution in a fashion which is relatively flexible and/or which can assist in protecting content owners' rights.

Many traditional approaches to distributing stored content, such as audio, video, text or software content, involve distributing media (such as print media, magnetic or optical media and the like) which, once distributed, can typically be freely used by any person having possession of the media. Such a distribution system, however, imposes certain undesirable restraints on how the content is distributed. For example, in traditional distribution methods, payment (or a contract or commitment to make payment) is obtained at the time the media is distributed. This has a number of consequences. The payment typically must be an all-or-nothing payment, i.e., payment for all content which is on the media, even though a customer may wish to have only a portion of such content. Typically, this manner of distribution means that distribution of the physical media and payment for content must be tightly coupled such as by providing for both distribution and payment at a retail location, by a mail transaction (such as a typical book club transaction), by electronic downloading and electronic commerce, and the like. Such distribution methods have substantial associated costs, such as costs of warehousing, retail personnel, and the like. Accordingly, it would be useful to provide a content distribution system which can be configured such that distribution of the media can be independent from payment or payment commitments, and/or independent from enablement of the content stored on the media.

In some systems involving electronic storage of information on media, the media which is distributed is encrypted or otherwise read-protected and the user must provide a code such as a password in order to have access to the content. This approach, however, although it may assist in certain schemes for avoiding unauthorized copying, has typically had other associated disadvantages. Such approaches typically provide for coupling the enablement of protected content to a particular computer or media reader, e.g., such that it is cumbersome or impossible to use the media in more than one machine (such as imposing a requirement for remembering, and then entering, the password when the media is provided in a second computer or reader, i.e., there is no provision for the media itself to provide, to a computer or reader, information regarding previous content enablement). When protection codes or keys are established and stored by a media fabricator (or the fabricator of a media player or host computer), or otherwise provided prior to distribution of content to a customer, the system is typically relatively inflexible, provides the potential for using a copy of the code or key to access multiple media, and presents a potential for interception of enabling keys or codes.

Many previous distribution systems, especially those relating to electronically or optically stored information, have been designed to prevent or discourage copying of content. Although certain copy protection systems may involve encryption/decryption, it is useful to understand that copy protection is not the same as content encryption and that copy protection is not the same as copyright protection. Implementation of effective copy prevention measures means that the entire cost for making copies falls on authorized distributors. Accordingly, it would be useful to provide a system in which customers are permitted or encouraged to make copies, and thus bear the cost of copying, while providing for appropriate payments to content owners and other appropriate entities. It would be useful to provide a system that does not prevent (and preferably encourages) copying, but which does provide copyright protection.

Some systems involve a key, code or decryption algorithm which is stored in a player device or host computer in a manner which can make it feasible to obtain the code, key or algorithm, or to defeat the protection procedure, by analyzing or modifying the player or host computer, thus potentially gaining access to any disk used in such player or host computer. Accordingly, it would be useful to provide a system in which access to a player or host key or code will not suffice, by itself to obtain access to multiple different disks.

SUMMARY

A method and system is provided for enabling data stored on a storage medium. An engine for reading the data stored on the storage medium is connected to a host device. A user of the storage medium selects a portion of the data on the storage medium to enable. The host device sends a message to a server complying with the requirements of the distributor of the data stored on the storage medium to enable the data. For example, some distributors may require payment of information from the user before enabling the data, thus in some embodiments, the message is payment, personal registration information, or demographic information. Once the distributor's requirements have been satisfied, the server sends a content key to the host device. In some embodiments, the distributor requirements and the content key are handles by separate servers. The content key is apiece of information required to decrypt the data, read the data, or make sense of the data stored on the storage medium. In some embodiments, the content key is a part of a decryption key necessary to decrypt the data stored on the storage medium, or a part of a file system necessary to organize and retrieve the data stored on the storage medium. The host device receives the content key and forwards it to the data storage engine. The data storage engine then stores the content key sent from the server to the storage medium. The content key is then combined with a medium enabling key stored on the storage medium during mastering to decrypt or read the data. The content key and the medium enabling key form data enabling information. They are not necessarily decryption keys. In some embodiments they are file pointers to data files stored on the storage medium, a directory structure of the data files stored on the storage medium, or an additional piece of data that is required to make sense of the data stored on the storage medium. An appropriate file system for storing data on the storage medium is disclosed in U.S. patent application Ser. No. 09/539,841 (Attorney Docket No. M-8374 U.S.), filed on Mar. 31, 2000, entitled "File System Management Embedded in a Storage Device" and incorporated herein in its entirety by this reference.

In some embodiments, the server and the data storage engine also exchange authentication messages. In some embodiments, the data storage engine sends a message to the server after attempting to store the content key on the storage medium, indicating whether the storage was successful.

The invention offers several advantages. First, it is possible for the user to enable, and therefore pay, for only portions of the data stored on the storage medium. The user does not have pay for data that the user does not require. Also, once the user pays to enable the data, the content key, is stored on the storage medium, thus the user may access the data from any data storage engine without providing the content key again. Further, the method offers robust security, because the neither the content key accessed from the content key database nor the medium enabling key stored on the storage medium during mastering alone can enable the data stored on the storage medium. Also, a copy of the original data does not transfer the content key received from the content key database.

BRIEF DESCRIPTION OF THE DRAWINGS

FIG. 2C illustrates, in a block diagram, one embodiment of the system of FIG. 1.

FIGS. 2D and 2E illustrate, in a flowchart, another embodiment of the method of FIG. 2A.

DETAILED DESCRIPTION

Figure 1:
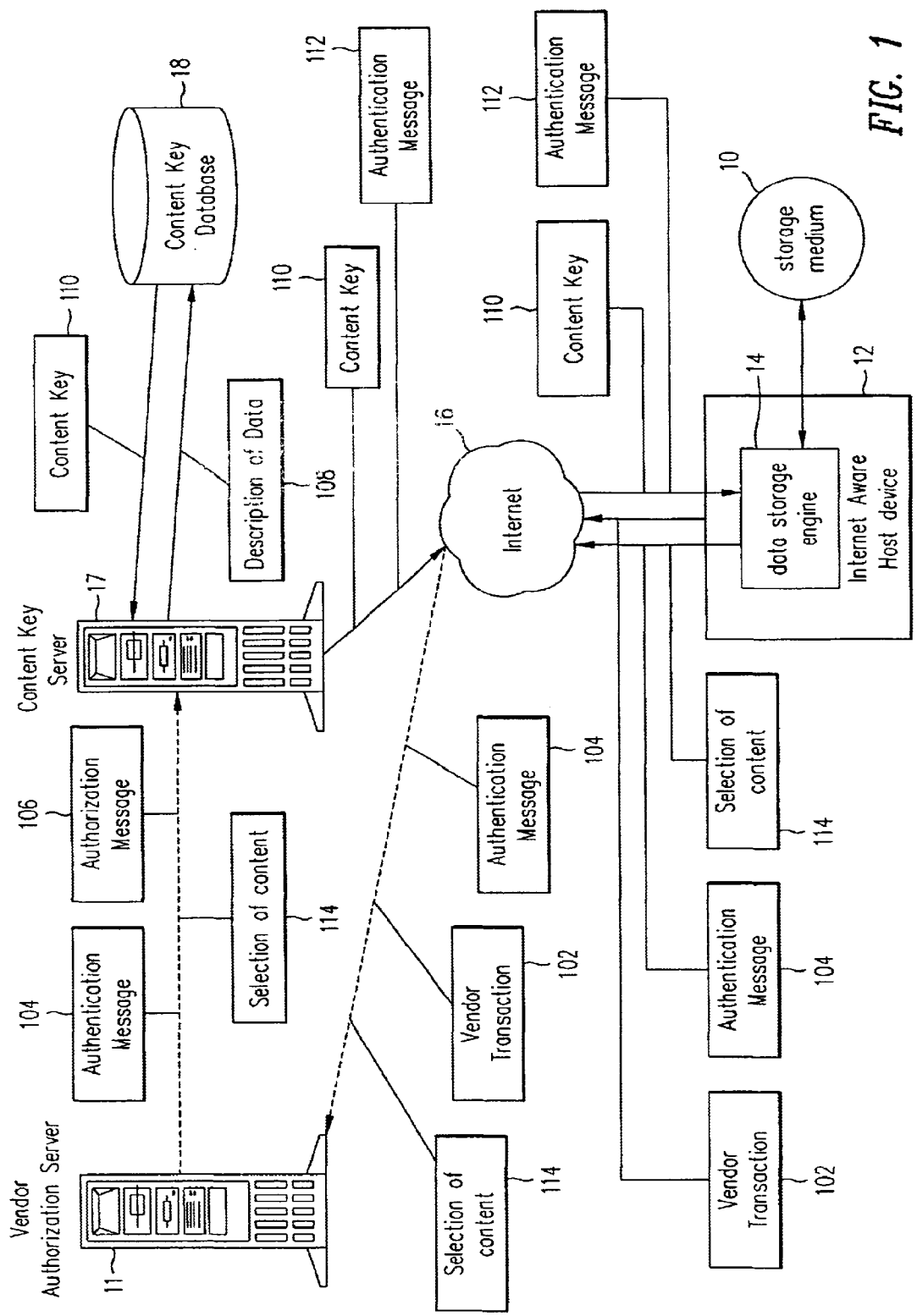
FIG. 1 illustrates, in a block diagram, a system for enabling data stored on a storage medium, according to the present invention.

FIG. 1 illustrates a system for enabling data, or content, stored on storage medium 10. A user places the storage medium into a network-aware host device 12. Host device 12 contains or connects to a device capable of reading the data stored on storage medium 10, hereinafter "data storage engine" 14 which reads and decrypts the data stored on storage medium 10. Data storage engine 14 includes an encryption engine for encrypting and decrypting data using the Data Encryption Standard (DES) algorithm, described in Federal Information Processing Standard Publication (FIPS PUB) 46, entitled "Data Encryption Standard" and published in 1977. Several modes of DES encryption and decryption are available. These modes are described in FIPS PUB 81, entitled "DES Modes of Operation" and published 1980. In one embodiment, the encryption engine supports several modes: single DES in ECB and CBC mode and triple DES in ECB and CBC mode. Single DES requires a single key to encrypt and decrypt and triple DES requires two or three keys to encrypt and decrypt. In some embodiments the encryption engine decrypts using triple DES with two or three keys. In some embodiments the encryption engine includes two DES cores, one for triple DES decryption and one for single DES encryption. In such an embodiment, information read from the storage medium can be decrypted by the triple DES decryption core, then immediately re-encrypted by the single DES encryption core using a different key.

Data storage engine 14 is connected to host device 12 through an interface, for example a universal serial bus (USB) interface. In some embodiments, data storage engine 14 is embedded within the host device and is connected to the host device by a proprietary interface. An appropriate interface is described in U.S. patent application Ser. No. 09/539,842 filed on Mar. 31, 2000, entitled "Asynchronous Input/Output Interface Protocol," and incorporated herein in its entirety by this reference. Such an embodiment may be a handheld device such as a personal digital assistant (PDA), MP3 player, or digital e-tablet; or a personal computer. In some embodiments, data storage engine 14 is external to the host device. In some embodiments, data storage engine 14 is not network-aware, and therefore requires host device 12 in order to communicate with other devices connected to the network. The host thus acts as an intermediary between data storage engine 14 and content key server 17.

In order to access the data, data storage engine 14 includes an encryption/decryption engine. When the user places the storage medium into the data storage engine, the engine reads a portion of the data stored on the storage medium, including a content information block. The content information block includes a directory of all the data files stored on the medium, a text file containing an Internet URL or multiple Internet URLs for a distributor authorization site or content key site that enables the data. The content information block may also include a textual description of the data, an abstract file containing a more detailed description of the data, and copyright information for the data. Host device 12 may present the information in the content information block to the user. Additionally, there may be a standard "launch" file stored on the medium that may be used by host device 12 to display the contents of the medium to the user. In some embodiments, host 12 connects to a server such as content key server 17 which reads the information in the content information block and formats an output display, for example an html display, which is displayed to the user by host device 12.

The user then selects a file or files to enable. Host device 12 then connects to the Internet 16. In one embodiment, host device 12 sends to distributor authorization server 11 a message satisfying the distributor's requirements, distributor transaction message 102, and a message identifying the content selected by the user 114. In this embodiment, distributor authorization server 11 forwards selection of content message 114 to content key server 17, along with an authorization message 106 indicating that the user has satisfied the distributor's requirements. In another embodiment, the distributor requirements are handled by content key server 17, thus both distributor transaction message 102 and selection of content message 114 are sent directly to content key server 17. Once the distributor requirement has been satisfied, a description of the data to be enabled 108 is sent from content key server 17 to content key database 18. Database 18 then returns the content key 110. Content key 110 is then either sent directly to host device 12 or sent to distributor authorization server 11, which forwards content key 110 to host device 12, which forwards content key 110 to data storage engine 14.

In some embodiments, data storage engine 14 sends an authentication message 104 to host device 12 to be sent along with the distributor transaction message 102 and selection of content message 114. Authentication message 104 verifies to content key server 17 that data storage engine 14 is an authorized engine. In embodiments where the distributor requirement is handled by distributor authorization server 11, authentication message 104 is forwarded to content key server 17 along with authorization message 106 and selection of content message 114. When content key server 17 responds by sending content key 110, content key server 17 also sends an authentication message 112 verifying to data storage engine 14 that content key server 17 is an authorized server. Authentication message 112 is either sent directly to host device 12 or to host device 12 through distributor authorization server 11. Host device 12 forwards authentication message 112 and content key 110 to data storage engine 14. Thus, distributor transaction message 102 is generated and sent by host device 12. Authentication message 104 is generated by data storage engine 14 and sent to host device 12 to be sent over Internet 16. Selection of content message 114 may be generated by either host device 12 or data storage engine 14.

Once content key 110 is received by data storage engine 14, the engine stores the content key on storage medium 10. Content key 110 can then be combined with the medium enabling stored on the storage medium during mastering, and the combined information used to access the data specified by the user. In one embodiment, the data is accessed by using the encryption/decryption engine on data storage engine 14 to decrypt the data using the combined information as the decryption key.

Figure 2A:
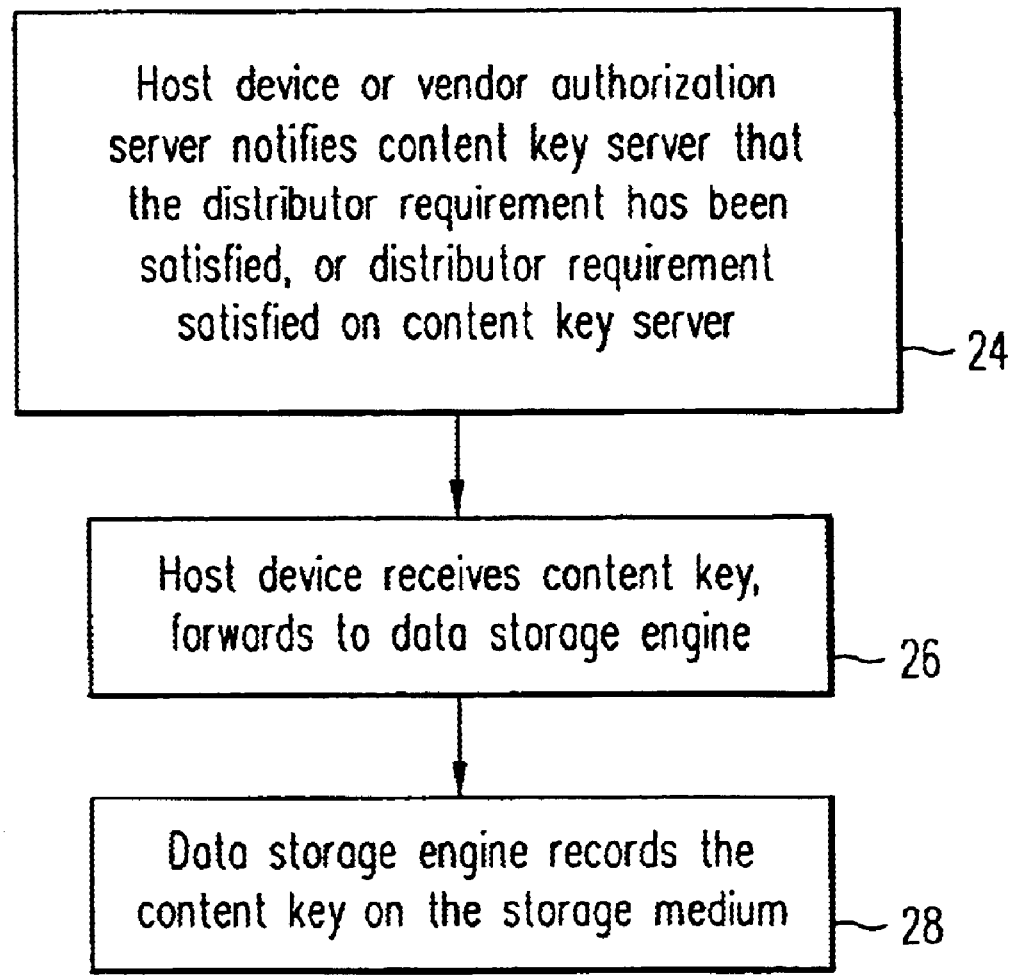
FIG. 2A illustrates, in a flowchart, a method of enabling data stored on the storage medium of FIG. 1, according to the present invention.

FIG. 2A illustrates a method of enabling content stored on a storage medium. In stage 24, the distributor requirement is satisfied. In some embodiments, the distributor of the content stored on the storage medium may require payment from the user, for example, in the form of a credit card authorization. In other embodiments, the distributor of the content stored on the storage medium may simply require the user to register with the distributor by providing personal information, or require the user to provide demographic information. In embodiments where a single server handles the distributor requirements and the content keys, in stage 24 the server simply verifies that the requirement has been met. In embodiments where separate servers handle the distributor requirements and the content keys, the content key server is notified by either the host device or the vendor authorization server that the distributor requirement has been met.

In stage 26, the host device receives from content key server 17 the content key required to decrypt the data stored on the storage medium. Host device 12 forwards the content key to data storage engine 14. In stage 28, data storage engine 14 records the content key on storage medium 10 of FIG. 1. In some embodiments, the content key is a portion of a 56-bit single or 112-bit triple DES key. In some embodiments, the content key is a 32-bit file identifier. The file identifier is also stored on the storage medium. Thus, when the file identifier is stored on the storage medium as the content key, the file referenced by the file identifier is enabled.

The content key stored in content key database 18 and sent by content key server 17 to data storage engine 14 is useless by itself. The data stored in storage medium 10 cannot be decrypted until the medium enabling key stored on data storage engine 14 or on the storage medium itself is retrieved and combined with the content key. Thus, the data is protected from unauthorized use even if a user is able to discover the content key stored in content key database 18 or determine the medium enabling key stored on data storage engine 14 or storage medium 10. In some embodiments, the distributor requirement occurs after the content key server sends the content key information.

Figure 2B:
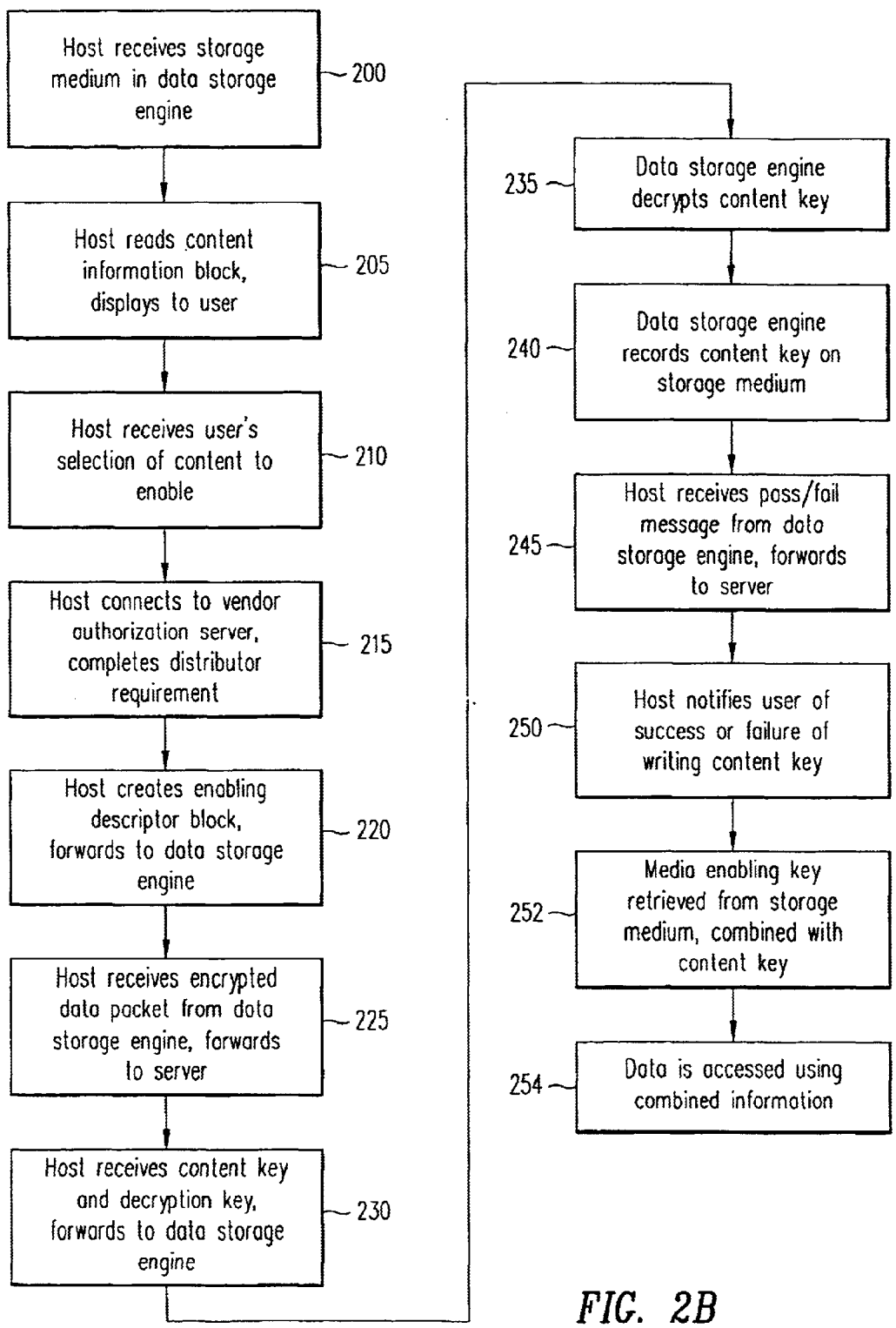
FIG. 2B illustrates, in a flowchart, one embodiment of the method of FIG. 2A.

FIG. 2B illustrates a more detailed embodiment of the method of FIG. 2A. In stage 200, host device 12 receives a storage medium in the data storage engine, for example if the user places a new storage medium in data storage engine 14, or if the user powers up host device 12 with a storage medium (e.g. an optical disk) in data storage engine 14. In stage 205, the host device reads the content information block from storage medium 10 and displays the content information block to the user. In stage 210, host device 12 receives the user's selection of data to enable. Host device 12 then connects to content key server 17 or a distributor authorization server and satisfies the requirements of the distributor for the selected data in stage 210. Host device 12 controls the distributor's required transaction. During the transaction with the distributor transaction, data storage engine 14 is dormant. Once the distributor's requirement is complete, host device 12 becomes simply a conduit for messages passing between content key server 17 and data storage engine 14.

In stage 220, host device 12 creates an enabling description block, a description of the data to be enabled, and forwards the enabling description block to data storage engine 14. In stage 225, host device 12 receives an encrypted data packet from data storage engine 14 and forwards it to content key server 17. The data packet includes the enabling descriptor block. Data storage engine 14 may also send authentication messages verifying that data storage engine 14 is in fact an authorized data storage engine, and requesting that the server authenticate that server 17 is in fact a content key server. In stage 230, host device 12 receives from content key server 17 the content key corresponding to the sent enabling descriptor block, and forwards the content key to data storage engine 14. The content key may be encrypted. Content key server 17 may also send an authentication message verifying that the server is a content key server. In stage 235, data storage engine 14 decrypts the content key. In stage 240, data storage engine 14 records the content key on storage medium 10. Data storage engine 14 then generates a message indicating whether or not the content key was successfully stored on storage medium 10. Data storage engine 14 forwards this message to the host device, which sends the message to content key server 17 over the Internet in stage 245. In stage 250, host device 12 notifies the user whether or not the content key was successfully stored on storage medium 10 of FIG. 1. In stage 252, the medium enabling key is retrieved from data storage engine 14 or storage medium 10 and combined with the content key. The data is then retrieved from storage medium 10 and decrypted by the encryption/decryption core of data storage engine 14 in stage 254 using the combined content key and medium enabling key. In other embodiments, the data are not encrypted, and the combined content key and medium enabling key provide a directory structure for the data, file pointers connecting the data files to a directory structure, or an additional piece of information necessary to make sense of the data.

FIG. 2C illustrates one embodiment of the system of FIG. 1 in more detail. In this embodiment, the distributor requirement and the content keys are both handled by a single server, content key server 17. Thus, there is no separate vendor authorization server. Content key server 17 includes application programs 17A, data access server 17B, and web server 17C. Application programs 17A includes software that performs functions required to complete content key transactions. The content key encryption/enabling engine retrieves the content keys from database 18 and encrypts the content keys before they are sent to data storage engine 14. The e-Commerce engine performs functions such as receiving pricing information requests from host 12, calculating the pricing information based on the files requested, and returning the pricing information to host 12. The advertisement engine retrieves from database 18 and formats advertisements displayed to users. The search engine allows to search the information displayed by content key server 17, such as data available for purchase. The page generation engine assembles web pages displayed to users. The personalization engine displays advertisements and other information based on the past activity of the particular user. The credit card processing engine process credit card transactions required by some distributors to enable content. The reporting engine allows administrators of content key server 17 and database 18 to generate reports from demographic and personal information collected from users. The customer service engine handles customer service requests received by email or telephone. The content management engine allows the administrator of content key server 17 to update or change the information displayed to users. The legacy systems engine allows content key server 17 to keep track of problems reported by users and customers. The e-mail communication allows users to communicate with administrators of the content key server by e-mail. Content key server 17 also includes data access services 17B for accessing and storing data in database 18. Content key server 17 also includes a web server 17C, for communicating with other devices over the Internet.

Database 18 contains three sets of data. The legacy data is data collected from user and customer complaints and comments. The media content and transactional data is the content keys and the files corresponding to those content keys. The customer data includes demographic and personal information of users who have connected to the content key server. The three sets of data may be stored in a single database or multiple databases. Content key server 17 communicates with database 18 using a software program such as Java Database Connections Drivers (JDBC).

Host 12 may be a personal electronic device with a connection to the Internet, or it may be software, such as HTML, XML, or a small Java program known as an applet, running on a personal computer. Host 12 communicates with the data storage engine 14 through an engine driver library 13, also called the driver. Driver 13 is a library of application programming interfaces (APIs) which allow host 12 and data storage engine 14 to exchange data.

Storage medium 10 contains a set of data files. Some of the data files are locked, meaning that a content key retrieved from content key server 17 is required to access the data, and some are unlocked, meaning no content key is required to access the data. Storage medium 10 may also contain a set of files called hidden files. The hidden files are not data files, rather they are files that contain information related to the data stored on the data files, such as information about the data in each file, information about the price of accessing the data in each file, or advertisements related to the data. Each data file and hidden file has a handle, a 32-bit unique identifier. The file handles are used by the medium, the engine, the host, and the content key server to identify the files.

Arrows 301–340 illustrate messages transferred between storage medium 10, data storage engine 14, driver 13, host 12, content key server 17, and database 18.

FIGS. 2D and 2E illustrate the transfer of messages 301–340 in a flowchart. In stage 301, the consumer makes a request to host 12 to see all currently locked files stored on storage medium 10. Host 12 calls the appropriate command on driver 13 to return a list of currently locked files on storage medium 10 in stage 302. In stage 303, driver 13 calls the appropriate command on data storage engine 14 to return a list of currently locked files on storage medium 10. Data storage engine 14 reads in stage 304 all files on storage medium 10 that meet two criteria: the status attribute of the file is set to locked and there are currently no content keys stored on storage medium 10 that have a pointer to the file's handle. In stage 305, data storage engine 14 reads any hidden files associated with the locked files found in stage 304. The hidden files contain a server URL where the content key for the data file can be found.

In stage 306, data storage engine 14 returns all files (name and handle) and Server URLs to driver 13. Driver 13 returns all files (name and handle) and Server URLs to host 12 in stage 307. Host 12 then displays in stage 308 a list of files to the consumer. Either host 12 or the distributor of the data may be responsible for the display of the data. If the distributor is responsible, the distributor must include a display file, such as an HTML file, as a file on the media. Each file or set of files may contain a hyperlink to another HTML file associated with the file.

In this embodiment, the distributor of the data requires payment in order to access the data. Thus, in stage 309, the consumer makes a request to view pricing information for the locked files. Host 12 connects to the Internet in stage 310 and sends the pricing request, which may include a Media ID identifying the particular storage medium 10 and files selected by the consumer, to the server URL, for example content key server 17, that was stamped on storage medium 10. At this point in time content key server 17 has established a Session with the consumer. If host 12 is software, when the consumer installs host 12, he will most likely register the product with some basic information about himself. In addition to sending the Media ID and file handles host 12 will also send this consumer information to content key server 17. This allows content key server 17 to maintain consumer behavior information even though the consumer has not actually purchased anything. In stage 311, content key server 17 establishes a Session ID with the consumer and logs consumer behavior and transaction data for the Session.

In stage 312, content key server 17 processes the data that was passed from host 12 and creates an HTML file (and any associated GIF and JPEG files) based on information retrieved based on the Media ID or file handles from the Media Content and Pricing portion of database 18. Content key server 17 passes an HTML file (and any associated GIF and JPEG files) to host 12 in stage 313. Because content key server 17 created the file, all links (such as to additional content information or advertisements) on the file will pass through the content key server, which means that content key server 17 is now in control of the Session with the consumer. The Session ID is embedded in this HTML files.

In stage 314, host 12 displays the HTML file to the consumer. The consumer selects one or more of the pricing options that are available and makes a request to host 12 to purchase the content in stage 315. Host 12 calls the appropriate command on driver 13 and sends a list of the file handles to be enabled and the Session ID generated by content key server 17 in stage 316. Driver 13 calls the appropriate command on data storage engine 14 and sends a list of the file handles to be enabled and the Session ID generated by content key server 17 in stage 317. Data storage engine 14 creates a hidden file on storage medium 10 that contains the file handles to be enabled and the Session ID generated by content key server 17 in stage 318. The process then continues in stage 319 of FIG. 2E.

In stage 319, data storage engine 14 creates an information packet that contains a random challenge, a data storage engine signature, the Session ID, and a list of file handles to be enabled. The information packet is encrypted. The random challenge and data storage engine signature are discussed below in reference to FIGS. 3A–3C and 4A–4C. In stage 320, data storage engine 14 returns the information packet to driver 13. Driver 13 returns the information packet to host 12 in stage 321. Host 12 sends the information packet to content key server 17 in stage 322.

In stage 323, content key server 17 decrypts the information packet and using the Session ID retrieves the pricing information that was originally sent to the consumer. Based on the handles that are included, content key server 17 is able to retrieve the exact price presented to the consumer. In stage 324, content key server 17 sends back an HTML page to host 12 that collects credit card data from the consumer. In stage 325, host 12 presents the HTML page to the consumer. The consumer completes the form on the HTML page submits the information in stage 326. In stage 327, host 12 sends the credit card information back to content key server 17. Content key server 17 then processes information and gets credit card authorization in stage 328.

In stage 329, content key server 17 creates an information packet that contains the random challenge, a content key server signature, the Session ID, a Transaction ID and the content keys for the file handles to be enabled. The information packet is encrypted. The content keys are retrieved from database 18. Content key server 17 returns an HTML page with a credit card authorization message and the newly created information packet to host 12 in stage 330.

In stage 331, host 12 calls the appropriate command on driver 13 and sends the information packet. In stage 332, driver 13 calls the appropriate command on data storage engine 14 and sends the information packet. Data storage engine 14 decrypts the information packet and verifies that the Session ID exists on storage medium 10 in stage 333. The Session ID was written on storage medium 10 in stage 318. Once verified, the Engine writes the information packet on storage medium 10.

Data storage engine 14 then creates in stage 334 an information packet that contains the random challenge, a data storage engine signature, the Session ID, the Transaction ID, and a pass or fail indicator. The information packet is encrypted. In stage 335, data storage engine 14 returns the information packet to driver 13. In stage 336, driver 13 returns the information packet to the host 12. In stage 337, host 12 sends the information packet to content key server 17. Content key server 17 decrypts the information packet and verifies the Session ID and Transaction ID in stage 338. Once verified, content key server 17 updates the transaction data stored in database 18. In stage 339, content key server 17 generates a final confirmation HTML page and sends it to host 12. In stage 340, host 12 presents the confirmation HTML page to the consumer and the transaction is complete.

Figure 3A:
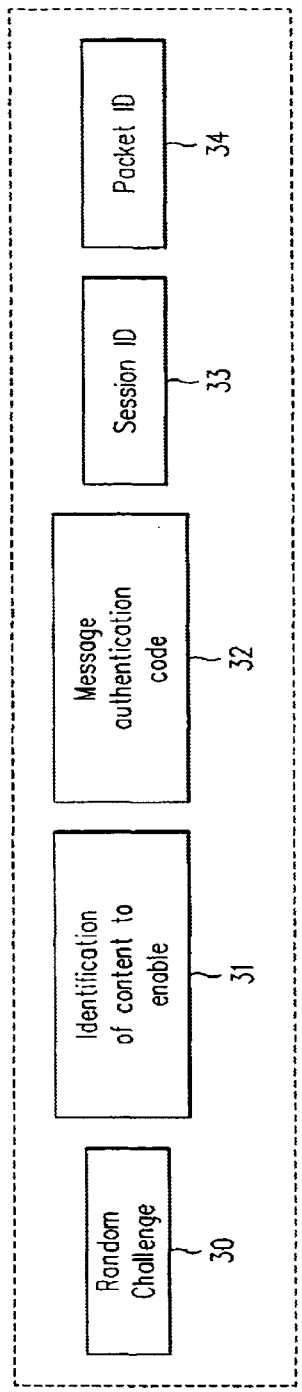
FIG. 3A illustrates, in a block diagram, the information contained in a first information packet sent from the data storage engine to the content key server of FIG. 1.
Figure 3B:
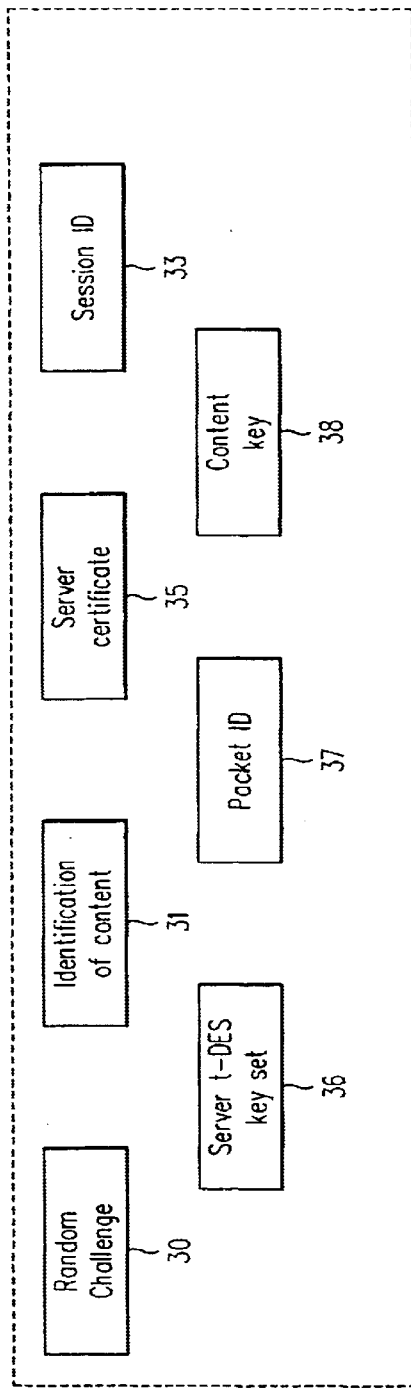
FIG. 3B illustrates, in a block diagram, the information contained in a second information packet sent from the content key server to the data storage engine of FIG. 1.
Figure 3C:
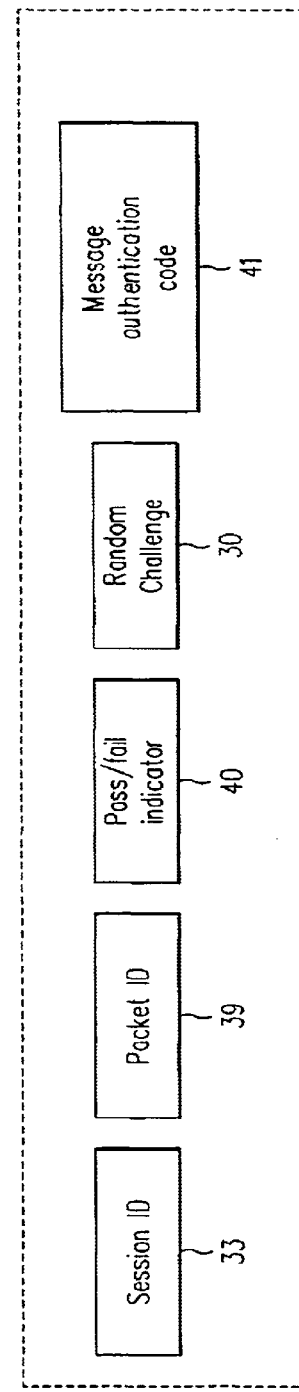
FIG. 3C illustrates, in a block diagram, the information contained in a third information packet sent from the data storage engine to the content key server of FIG. 1.

FIGS. 3A–3C illustrate information packets sent between data storage engine 14 and content key server 17. FIG. 3A illustrates a first information packet, send from data storage engine 14 via host 12 to content key server 17 in one embodiment of stage 225 of FIG. 2B. The information packet contains random challenge 30, identification of the content to be enabled 31, a message authorization code 32, a session ID 33 and a packet ID 34. Random challenge 30 is a message that verifies that the server is responding to the correct query. Random challenge 30 is sent to content key server 17, decrypted by the server, then re-encrypted and sent back to data storage engine 14. If the random challenge data storage engine 14 receives back from the server is identical to random challenge 30 the data storage engine sent to the server, the server has responded to the appropriate message from the appropriate data storage engine. ID message 31 contains an identification of the content the user has selected to enable. In some embodiments, ID message 31 is the file handles selected by the user and a count of the number of files to be unlocked. The content selected by the user may be all the data stored on storage medium 10, or only a portion of the data stored on storage medium 10. The message authorization code (MAC) 32 is a encrypted hash of the entire packet that verifies content key server 17 that the packet has not been altered in transit. Session ID 33 is generated by content key server 17 and sent to data storage engine 14 when the user requests pricing information in FIG. 2D. Packet ID 34 is assigned by data storage engine 14. In one embodiment, MAC 32 is generated by the DES engine run in triple CBC mode. The data is first encrypted using triple DES-CBC. The last data block of encrypted data is encrypted again to produce MAC 32, which is a hash value for the data. The MAC authenticates the data because for one to generate the MAC, one must know the keys used for the triple DES-CBC. In another embodiment, MAC 32 is a standard hash value generated using a standard algorithm such as SHA-1 described in FIPS PUB 180-1. If MAC 32 is created using SHA-1, then the MAC must be encrypted prior to transmission to prevent someone from removing the MAC from the information packet, modifying the data, then recomputing the MAC and adding it back into the information packet. In some embodiments, each item in the first information packet is encrypted, then the entire packet is encrypted according to FIG. 4A. FIG. 3B illustrates the second information packet sent from content key server 17 to data storage engine 14 via host 12 in one embodiment of stage 230 of FIG. 2B. The information packet contains random challenge 30 identification of content 31, server certificate 35, session key 33, content key 38, key server 36, and packet ID 37. Random challenge 30 was sent to content key server 17 encrypted. If the server was able to successfully decrypt and resend the random challenge, the server is content key server 17, and therefore the random challenge sent back by content key server 17 is identical to the random challenge sent by data storage engine 14. Identification of content 31 is the same content ID message sent by data storage engine 14. Server certificate 37 verifies that content key server 17 is an authorized server. Server certificate 37 is encrypted using a trusted third party key. Session key ID 33 is also the same as the Session ID sent by data storage engine 14. The packet also contains a triple DES server key 36 and a packet ID 37, both generated by content key server 17.

FIG. 3C illustrates the third information packet, sent from data storage engine 14 via host 12 to content key server 17 in one embodiment of stage 245 of FIG. 2B. The third information packet is sent after data storage engine 14 succeeds or fails to write the content key to storage medium 10. The information packet contains session ID 33, a packet ID 39, a pass/fail indicator 40, random challenge 30, and a MAC 41. Thus, the third information packet has the same structure as the first information packet, which allows the content key server to recover the Session ID and the Packet ID from information packets received from the data storage engine regardless of whether the packet is a packet illustrated in FIG. 3A or a packet illustrated in FIG. 3C. Pass/fail indicator 40 indicates whether data storage engine 14 was able to successfully store the content key on storage medium 10. If pass/fail indicator 41 indicates that data storage engine 14 was not able to store the content key, the transaction required by the distributor between the user and content key server 17 or the distributor authorization server is canceled. Packet ID 39 is generated by data storage engine 14.

In one embodiment, the server certificate, random challenge, and public/private key used to encrypt the three information packets, pairs are generated using a toolkit called "Security Builder 2.1.1 for Embedded Systems" available from Certicom, Inc. of Hayward, Calif. The data packets illustrated in FIGS. 3A–3C are small and encrypted, such that they can be transmitted quickly over the Internet or another network without the need for a secured protocol, such as a virtual private network.

Figure 4A:
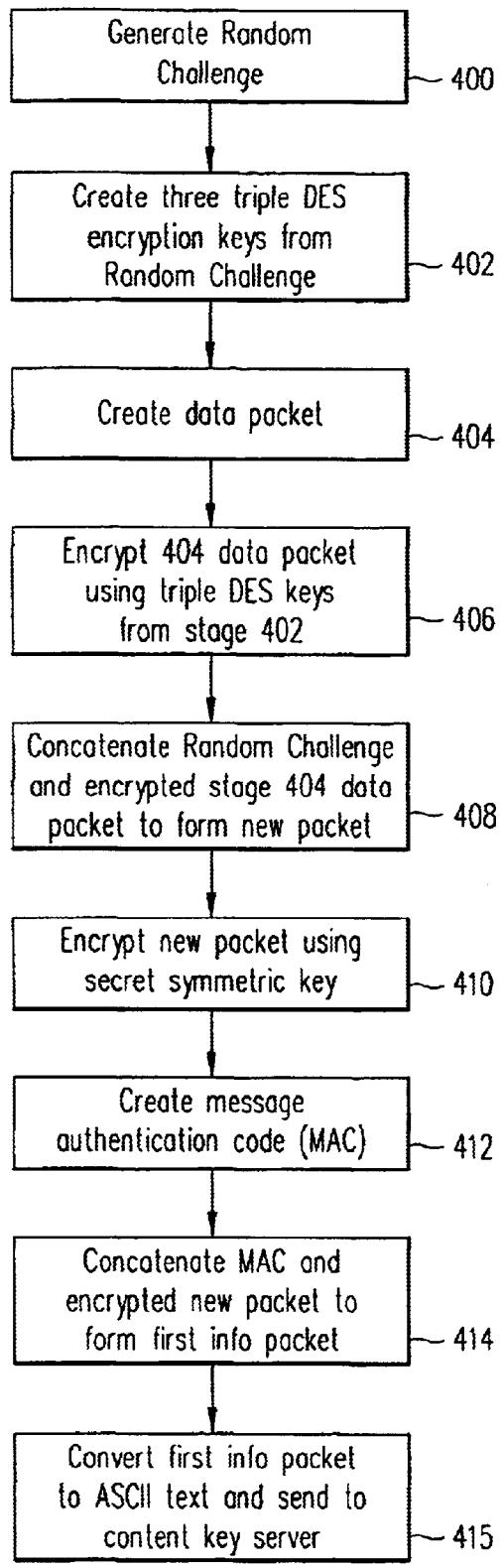
FIG. 4A illustrates, in a flowchart, acts performed by data storage engine 14 of FIG. 1 in generating and sending the first information packet of FIG. 3A.

FIG. 4A illustrates, in a flowchart, acts performed by data storage engine 14 in generating the first information packet, shown in FIG. 3A. In stage 400, the random challenge is generated. In stage 402, three triple DES-CBC mode keys are generated from the random challenge. In one embodiment, the random challenge is a multi-bit number and the three triple-DES keys are portions of the random challenge. In stage 404, a data packet is created. The data packet includes the session ID sent by content key server 17 when the user requested pricing information in FIG. 2D. The data packet also includes the packet ID and information about the content to be enabled, such as the file handles of the files to be enabled and a count of the files to be enabled. The data packet also includes a pad block. The pad block is data that is added to make sure the packet can be split up evenly into 64-bit sections for DES encryption.

In stage 406, the data packet is encrypted using the three triple DES keys created in stage 402. In stage 408, the random challenge generated in stage 400 and the encrypted data packet are concatenated to form a new packet. In stage 410, the new packet is encrypted using a secret symmetric key. The secret symmetric keys are generated by the entity that manufactures the data storage engine and licenses the content key server to sell storage media that can be read by the data storage engine. In one embodiment, the secret symmetric keys are three triple-DES keys and the new packet is encrypted using triple-DES. The keys are given to the content key server when the server is licensed. In stage 412, the message authorization code (MAC) is generated as described in reference to FIG. 3A. In one embodiment, when the new packet is encrypted using triple-DES CBC, the last block of encrypted text is re-encrypted using the keys generated in stage 402. This double-encrypted last block of text is the MAC.

In stage 414, the MAC and the encrypted new packet are concatenated to form the first information packet to be sent to the content key server. In stage 415, the first information packet is converted to ASCII text and sent to the content key server as a string of data in an HTML file.

Figure 4B:
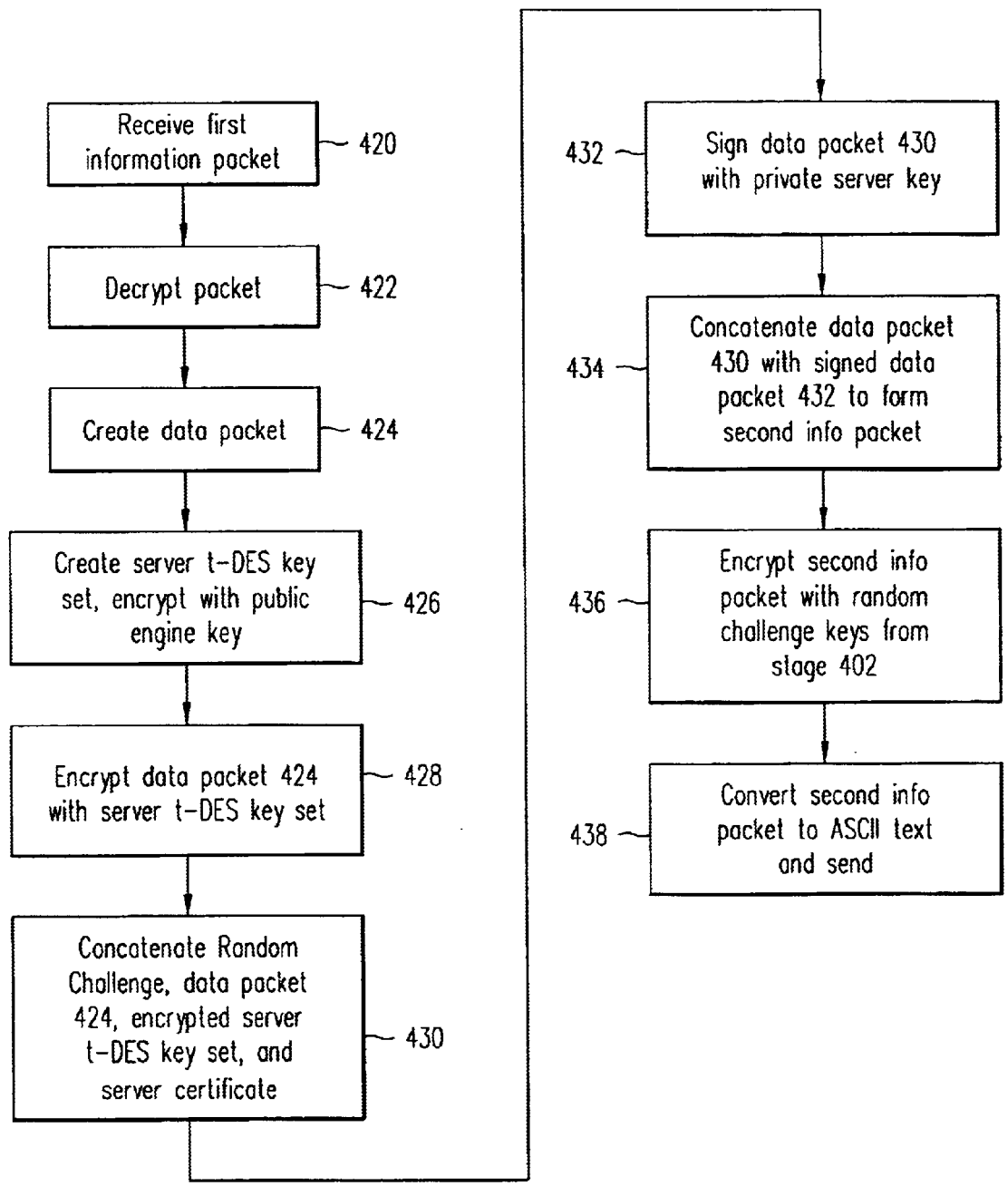
FIG. 4B illustrates, in a flowchart, acts performed by content key server 17 of FIG. 1 in receiving the first information packet of FIG. 3A and generating and sending the second information packet of FIG. 3B.

FIG. 4B illustrates acts performed by the content key server in decrypting the first information packet and creating the second information packet to be sent back to the data storage engine. In stage 420, the content key server receives the first information packet. The packet is then decrypted in stage 422. The packet is decrypted by first separating the packet into the MAC formed in stage 412 and the encrypted new packet formed in stage 410. The new packet is then decrypted using the secret symmetric keys given to the content key server during licensing. The new packet is then separated into the random challenge formed in stage 400 and the data packet formed in stage 404. The content key server then creates the three encryption keys from the random challenge the same as the data storage engine did in stage 402. The MAC can then be verified by re-encrypting the last block of the data packet using the three encryption keys from the random challenge. Once the MAC is verified, the data packet created in stage 404 is decrypted.

In stage 424, the content key server creates a data packet containing the session ID, the packet ID, the description of content (the file handles and file count), and the content key for each file. In stage 426, a set of triple-DES keys is created by the content key server. The triple-DES key set is called the server t-DES keys. The server t-DES keys are then encrypted using a public engine key. The public engine key is part of a public/private key pair generated by the entity that manufactures the data storage engine 14. The public engine key is given to the content key server when the content key server is licensed by the manufacturing entity.

In stage 428, the data packet formed in stage 424 is encrypted using the server t-DES key set. In stage 430, the random challenge, the encrypted server t-DES key set, the encrypted data packet formed in stage 424, and the server certificate are concatenated to form another data packet. The server certificate is also issued to the content key server by the manufacturing entity during server licensing, and is signed by a private key which is part of a public/private key pair held by the manufacturer. In stage 432, the packet formed in stage 430 is signed with a digital signature using the private server key. The private server key is part of a public/private key pair and is given to the content key server during licensing by the manufacturing entity. In stage 434, the data packet formed in stage 430 is concatenated with the signature formed in stage 432. This new data packet formed in stage 434 is then encrypted in stage 436 using the random challenge keys generated in stage 402. The data packet formed in stage 436 is the second information packet shown in FIG. 3B. In stage 438, the data packet formed in stage 436 is then converted to ASCII text and sent to the data storage engine.

Figure 4C:
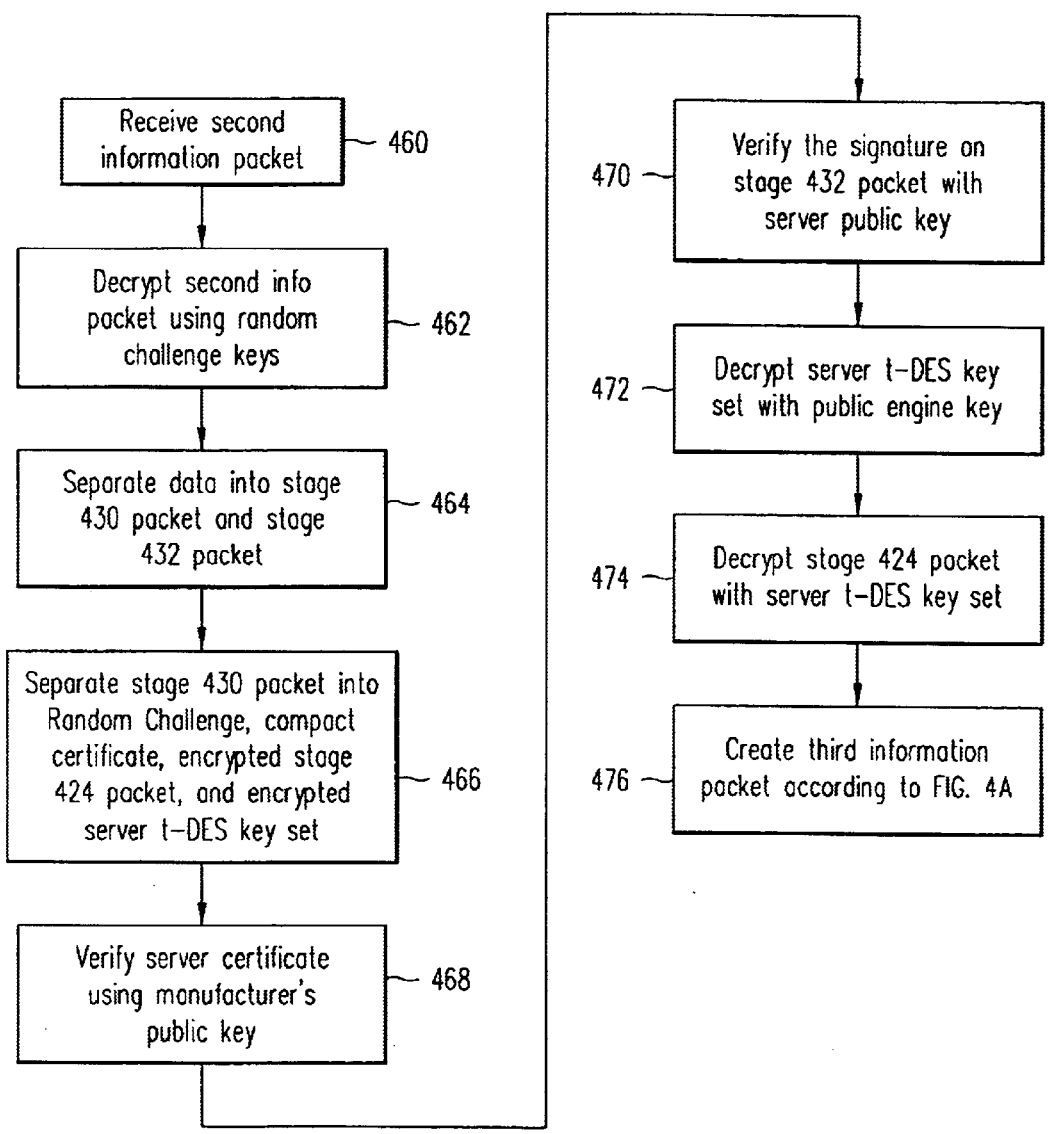
FIG. 4C illustrates, in a flowchart, acts performed by data storage engine 14 of FIG. 1 in receiving the second information packet of FIG. 3B and generating and sending the third information packet of FIG. 3C.

FIG. 4C illustrates acts performed by the data storage engine in decrypting the second information packet and generating the third information packet. In stage 460, the data storage engine receives the second information packet. In stage 462, the second information packet is decrypted using the random challenge keys generated in stage 402. In stage 464, the decrypted packet is separated into the packet formed in stage 430 and the server signature formed in stage 432. In stage 466, the packet formed in stage 430 is separated into the random challenge, the server certificate, the encrypted server t-DES key set, and the data packet formed in stage 424. In stage 468, the server certificate is verified using the manufacturer's public key, part of the public/private manufacturer key pair, which is given to the engine during manufacture by the manufacturing entity. In stage 470, the digital signature on the packet formed in stage 430 and signed in stage 432 is verified using the server public key, part of the public/private server key pair, which is contained within the server certificate.

In stage 472, the server t-DES key set formed in stage 426 is decrypted using the private engine key, part of the public/private engine key pair, and given to the engine during manufacture. In stage 474, the packet formed in stage 424 is decrypted using the server t-DES key set. The decrypted information can then be separated and the content keys for each file enabled by the user retrieved. The content keys are then written to the storage medium by the data storage engine. The keys may be encrypted using a secret key stored within the data storage engine prior to writing them to the media. In stage 476, a third information packet is formed according to the procedure described in FIG. 4A. The data packet formed in stage 404 contains the session ID, the packet ID, and an indicator of whether the data storage engine was able to successfully write the content keys to the storage medium.

Table 1 illustrates keys used to encrypt and decrypt data sent in the three information packets shown in FIGS. 3A–3C, according to one embodiment of the invention. Table 2 illustrates data included in the three information packets shown in FIGS. 3A–3C, according to one embodiment of the invention. Table 3 illustrates cryptographic functions used to encrypt and decrypt the data sent in the three information packets shown in FIGS. 3A–3C, according to one embodiment of the invention.

TABLE 1

Keys for encrypting and decrypting.

| Name | Bits | Notes |
|---|---|---|
| Manufacturer. Public Key | 326 | This is a public key that will be issued to all licensed data storage engines and will be used to verify a Server's Certificate which in turn provides the Engine with the Server's Public Key ($P_e$) |
| Manufacturer. Private Key | 163 | This is a private key that will only be held by the manufacturer, and will be used to create Server Certificates for licensed Servers. |
| Manufacturer TDES-CBC Key | 168 | This is a symmetric TDES-CBC key that will be issued to all licensed Engines and Servers. |
| Engine Public Key | 326 | This is a public key that will be issued to all licensed Servers. |
| Engine Private Key | 163 | This is a private key that will be issued to all licensed Engines. |
| Engine Random Challenge and TDES-CBC Key | 128 | This is a random key that the Engine will generate and will be used as a random challenge to the server, and to create a TDES-CBC key for communicating with the server. |
| Server Public Key | 326 | Each licensed Server will be issued a public key by the manufacturer. |
| Server Private Key | 163 | Each licensed Server will be issued a private key by the manufacturer. |
| Server | 326+ | Each licensed Server will be issued a Server |

TABLE 1-continued

Keys for encrypting and decrypting.

| Name | Bits | Notes |
|---|---|---|
| Certificate | 160 | Certificate that will be used by the Engines to authenticate the Server's Public Key. |
| Server Random TDES-CBC Key | 168 | This is a random key that the Server will generate and will be used when transmitting content key information to the Engine. |

TABLE 2

Data contained in the information packets.

| Name | Bits | Notes |
|---|---|---|
| Session ID | 128 | The Session ID is created by the host pricing server when pricing information is created for a user. The session ID is linked to the set of Locked File Handles that were originally queried by the user. |
| Media ID | 128 | A unique ID that is created during the premastering process for a piece of media. It is unique for each master. |
| Packet ID | 16 | An identifier indicating the type of packet. The identification allows each end to know what part of the transaction is taking place, and can also be verified for correctness given each end's belief of what the current state should be. |
| Locked File Count | 32 | The number of file handles that are going to be unlocked in this session. |
| Locked File Handles | 32 * n handles | The set of locked files requested by the user to unlock on the media. |
| Content keys | (112 + 16) * n handles | The key value (112 bits) and rules (16 bits) associated with each locked file. |

TABLE 3

Cryptographic functions.

| Name | Location | Certicom Function | Parms | Usage |
|---|---|---|---|---|
| Sign | Manufacturer and each licensed server | ecdsa_PwdSign | Private Key, Data to sign | This function is used to create a digital signature on the data to sign. The message digest for the signature is created through the SHA-1 hash function. |
| Verify | Engine | ecdsa_Verify | Public Key, Signed Message Digest | This function verifies that a signature is authentic. |
| Encrypt | Server | sb_desEncrypt | TDES-CBC mode, Keys, Initial Vector, Data | Used by the server to encrypt the data using TDES-CBC mode. |
| Encrypt | Engine | Hardware ASIC | TDES-CBC mode, Keys, Initial Vector, Data | The engine uses a hardware ASIC to perform TDES-CBC encryption. |
| Decrypt | Server | sb_desDecrypt | TDES-CBC mode, Keys, Initial Vector, Data | Used by the server to decrypt the data using TDES-CBC mode. |
| Decrypt | Engine | Hardware ASIC | TDES-CBC mode, Keys, | The engine uses a hardware ASIC to perform TDES-CBC decryption. |

TABLE 3-continued

Cryptographic functions.

| Name | Location | Certicom Function | Parms | Usage |
|---|---|---|---|---|
| Wrap | Server | sb_ecesWrap | Initial Vector, Data Public Key, Data | Encrypts data using using a 326-bit ECC public key. |
| UnWrap | Engine | sb_ecesPwdUnwrap | Private Key, Data | Decrypts data using using 163-bit ECC private key. |
| CreateMac | Engine | Hardware ASIC | Data, Key | Creates the MAC used as hash and authentication for the engine. |
| CreateMac | Server | sb_desEncrypt | Data, Key | Creates the MAC used to verify the MAC created by the engine. |

Various modifications and adaptations of the embodiments and implementations described herein are encompassed by the attached claims. For example, the content key may be any piece of data required to read the data or make sense of the data stored on storage medium 10. Specifically, in some embodiments, the data stored on the storage medium is not encrypted, and the content key sent by content key server 17 is not part of a decryption key, rather it is a portion of the file system necessary to find an individual file or a portion of data set itself. Further, host device 12 can connect to content key server 12 over any network, not just the Internet. Also, host device 12 can connect to content key server 17 over the network using a wireless connection, or a direct dial-up connection. The invention can be used with any type of writable storage medium such as optical storage media, magnetic storage media, floppy disks, tapes, or CDs. The invention can also be used with any kind of host device, such as a personal computer, handheld device, or cellular telephone.

What is claimed is:

1. A method of enabling access to encrypted data stored on a storage medium coupled through a data storage engine to a host device, the method comprising:
   transmitting through a network a content enabling message from the host device to a distributor authorization server, wherein the content enabling message satisfies a requirement for access to the encrypted data;
   in response to satisfying the requirement for access to the encrypted data, transmitting through the network a first portion of a decryption key from a content key server to the host device;
   combining the first portion of the decryption key with a second portion of the decryption key stored on the storage medium to form the decryption key, wherein the decryption key enables decryption of the encrypted data; and
   storing the decryption key on the storage medium, whereby the host device may access the encrypted data.

2. The method of claim 1 wherein the content enabling message comprises payment.

3. The method of claim 1 wherein the content enabling message comprises demographic information.

4. The method of claim 1 wherein the content enabling message comprises personal information.

5. The method of claim 1 further comprising:
   decrypting the encrypted data using the decryption key.

6. The method of claim 1 wherein the distribution authorization server and the content key server are the same.

7. The method of claim 6 wherein the network is the Internet.

8. The method of claim 6 further comprising:
   transmitting an authentication message to the content key server.

9. The method of claim 8 wherein the transmitting an authentication message to the content key server is performed by a data storage engine.

10. The method of claim 6 further comprising:
    transmitting a message to the content key server verifying storage of the first portion of the decryption key on the storage medium.

11. The method of claim 10 wherein the transmitting a message to the, content key server verifying storage of the decryption key is performed by a data storage engine.

12. The method of claim 6 further comprising:
    receiving an authentication message from the content key server.

13. A method of enabling access to data stored on a storage medium coupled to a host device through a data storage engine, the method comprising:
    transmitting through a network a content enabling message to a server, wherein the content enabling message satisfies a distribution requirement enabling access to the data;
    in response to satisfaction of the distribution requirement, receiving a content key transmitted from the server through the network;
    storing the content key on the storage medium;
    combining the content key with a medium enabling key stored on the storage medium to form a data enabling message; and
    accessing the data stored on the storage medium using the data enabling message.

14. The method of claim 13 wherein the content enabling message comprises payment.

15. The method of claim 13 wherein the content enabling message comprises personal information.

16. The method of claim 13 wherein the content enabling message comprises demographic information.

17. The method of claim 13 wherein the transmitting, receiving, storing, combining, and accessing are all performed by the data storage engine.

18. The method of claim 13 further comprising:
    transmitting a first authentication message to the server; and
    receiving a second authentication message from the server;
    wherein the first authentication message authenticates the data storage engine and the second authentication message authenticates the server.

19. The method of claim 18 wherein the transmitting a first authentication message the receiving a second authentication message are performed by the data storage engine.

* * * * *